United States Patent
Han et al.

(10) Patent No.: US 10,623,484 B2
(45) Date of Patent: Apr. 14, 2020

(54) P2P FILE TRANSMISSION MANAGEMENT METHOD AND SYSTEM

(75) Inventors: Zhu Han, Beijing (CN); Yi Xin Zhao, Beijing (CN); Kai Zheng, Beijing (CN); Huan Hao Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 13/393,117

(22) PCT Filed: Aug. 19, 2010

(86) PCT No.: PCT/JP2010/005129
§ 371 (c)(1),
(2), (4) Date: Aug. 10, 2012

(87) PCT Pub. No.: WO2011/024418
PCT Pub. Date: Mar. 3, 2011

(65) Prior Publication Data
US 2012/0303715 A1    Nov. 29, 2012

(30) Foreign Application Priority Data
Aug. 28, 2009  (CN) .......................... 2009 1 0168614

(51) Int. Cl.
*G06F 15/16* (2006.01)
*H04L 29/08* (2006.01)

(52) U.S. Cl.
CPC ................................ *H04L 67/1063* (2013.01)

(58) Field of Classification Search
CPC ... H04L 67/1063; H04L 45/02; H04L 67/104; H04L 41/0226; H04L 41/12; H04L 67/06
(Continued)

(56) References Cited

U.S. PATENT DOCUMENTS 6,065,062 A * 5/2000 Periasamy et al. ........... 709/242
7,359,393 B1 * 4/2008 Nalawade ............... H04L 45/02
                                                          370/254
(Continued)

FOREIGN PATENT DOCUMENTS

EP       2086206 A1 *  8/2009  ............. H04L 47/20
EP     2 086 206 A1    9/2012
(Continued)

OTHER PUBLICATIONS

Thanunchai Threepak, "Bittorrent Cache Using Virtual Tracker," 2006, URL: http://ieeexplore.ieee.org/stamp/stamp.jsp?arnumber=4141534.*
(Continued)

*Primary Examiner* — Backhean Tiv
*Assistant Examiner* — Schquita D Goodwin
(74) *Attorney, Agent, or Firm* — Scully, Scott, Murphy & Presser, P.C.; Kevin M. Jordan, Esq.

(57) ABSTRACT

An efficient, flexible P2P file transmission management technology for limiting and directing of P2P file transmission mainly by replacing an original tracker server with a setting controllable tracker server, and modifying node list based on predetermined rule in the controllable tracker server. With the present invention, a network operator can strengthen function of the controllable tracker server in P2P communication gradually by weakening function of the original tracker server in P2P communication gradually, and utilize various rules or policies established in advance to manage file transfer of P2P nodes.

14 Claims, 10 Drawing Sheets

(58) Field of Classification Search
USPC ....... 709/219, 204, 205, 242, 218, 231, 227, 709/229, 202; 370/252, 254, 400; 707/4
See application file for complete search history.

(56) References Cited

U.S. PATENT DOCUMENTS

| | | | | |
|---|---|---|---|---|
| 8,208,477 | B1* | 6/2012 | Xiong | H04L 67/1065 370/400 |
| 2003/0055898 | A1* | 3/2003 | Yeager et al. | 709/205 |
| 2006/0212584 | A1* | 9/2006 | Yu | G06F 17/30902 709/227 |
| 2007/0220160 | A1* | 9/2007 | Seidel | H04L 67/104 709/230 |
| 2007/0294422 | A1* | 12/2007 | Zuckerman | G06F 17/30206 709/230 |
| 2008/0016201 | A1* | 1/2008 | Thompson | H04L 47/10 709/223 |
| 2008/0133666 | A1* | 6/2008 | Chavez | H04L 67/104 709/205 |
| 2008/0140853 | A1* | 6/2008 | Harrison | H04L 47/10 709/231 |
| 2008/0285577 | A1* | 11/2008 | Zisapel | H04L 12/2856 370/409 |
| 2009/0037960 | A1* | 2/2009 | Melby | H04N 7/173 725/87 |
| 2009/0070482 | A1* | 3/2009 | Hickmott | H04L 67/104 709/233 |
| 2009/0100128 | A1* | 4/2009 | Czechowski, III | H04L 67/104 709/203 |
| 2009/0106393 | A1* | 4/2009 | Parr et al. | 709/218 |
| 2009/0125891 | A1* | 5/2009 | Garimella | G06F 11/3612 717/131 |
| 2009/0177772 | A1* | 7/2009 | Guan | H04L 61/1582 709/224 |
| 2009/0259667 | A1* | 10/2009 | Wang | H04L 45/125 |
| 2009/0265473 | A1* | 10/2009 | Hydrie | H04L 67/104 709/229 |
| 2009/0319502 | A1* | 12/2009 | Chalouhi et al. | 707/4 |
| 2010/0036935 | A1* | 2/2010 | Casalta et al. | 709/219 |
| 2010/0106835 | A1* | 4/2010 | Mikan | H04L 41/5054 709/226 |
| 2010/0146138 | A1* | 6/2010 | Ng | H04L 65/80 709/231 |
| 2010/0185769 | A1* | 7/2010 | Zhang | G06F 17/30017 709/227 |
| 2010/0293294 | A1* | 11/2010 | Hilt | H04L 67/104 709/241 |
| 2011/0082928 | A1* | 4/2011 | Hasha | H04L 67/1095 709/224 |
| 2011/0110269 | A1* | 5/2011 | Maenpaa | H04L 67/104 370/254 |
| 2011/0243024 | A1* | 10/2011 | Osterling et al. | 370/252 |
| 2012/0036523 | A1* | 2/2012 | Weintraub | H04N 7/173 725/9 |
| 2012/0259922 | A1* | 10/2012 | Chen et al. | 709/204 |
| 2013/0238683 | A1* | 9/2013 | Wald | H04L 67/06 709/202 |
| 2014/0032477 | A1* | 1/2014 | Trammel | G06F 9/5061 707/600 |

FOREIGN PATENT DOCUMENTS

| | | |
|---|---|---|
| WO | WO 2009/117338 A2 | 9/2009 |
| WO | WO 2010/064965 A1 | 6/2010 |

OTHER PUBLICATIONS

Cisco Systems, "Improving Traffic Locality in BitTorrent via Biased Neighbor Selection", URL: http://crypto.stanford.edu/~cao/biased-bt.pdf.*
University of Kent, "CO600: MirrorBit—BitTorrent Seed Service", URL: https://www.cs.kent.ac.uk/pubs/ug/2008/CO600/report/mirrortf/report.pdf.*
Thanunchai Threepak, Bittorrent Cache Using Virtual Tracker, 2006, pp. 162-165 (Year: 2006).*
Rajani .B. Paraddi, A Seminar Report on Bittorent Protocol, 2006, pp. 1-24 (Year: 2006).*
Brian Dessent, Brian's BitTorrent FAQ and Guide, Mar. 29, 2007, pp. 1-30 (Year: 2007).*
Xie et al., "P4P: Explicit Communications for Cooperative Control Between P2P and Network Providers",[Online], P4PWG, 2007, [retrieved on Sep. 16, 2010], Retrieved from the Internet :<URL : http://www.dcia.info/documents/P4P_Overview.pdf>.
Anonymous, P4P: A Portal for Proactive Provider Participation in P2P. [Online], Haiyong Xie 2007, [retrieved on Sep. 16, 2010], Retrieved from the Internet :<URL : http://cs-www.cs.yale.edu/homes/yong/p4p.html>.
PCT/JP2010/005129 International Search Report dated Sep. 28, 2010.
CN101465785A, English language Abstract, Jun. 24, 2009.
CN101483604A, English language Abstract, Jul. 15, 2009.
Chinese Office Action, 200910168614.X, dated Jan. 14, 2013.
Abstract of UK Patent Application No. GB 2485120 A, filed Aug. 19, 2010.
Abstract of China Patent No. CN101710871 (A), filed May 19, 2010.
Xie et al., "P4P: Explicit Communications for Cooperative Control Between P2P and Network Providers", May 25, 2007.
Xie et al., "P4P: A Portal for Proactive Provider Participation in P2P", http://cs-www.cs.yale.edu/homes/yong/p4p.html; 2007, pp. 1-3.

* cited by examiner

P2P FILE TRANSMISSION MANAGEMENT METHOD AND SYSTEM

CROSS-REFERENCE TO RELATED APPLICATIONS

The present invention relates to and claims the benefit of the filing date of commonly-owned, co-pending PCT Patent Application No. PCT/JP2010/005129, filed Aug. 28, 2010, which further claims the benefit of priority date of commonly-owned, co-pending Chinese Patent Application No. CN 200910168614.X, filed on Aug. 28, 2009, the entire contents and disclosure of which is incorporated by reference as if fully set forth herein.

TECHNICAL FIELD

The present invention relates generally to data transmission management method and system, in particular, to a method and system for managing P2P file transmission.

BACKGROUND ART

Peer-to-peer technology (P2P for short) is referred as ad-hoc network technology, which depends on computer capability and bandwidth of participants in the network, rather than depends on a few servers. In a P2P structure, every node (peer) simultaneously has functions in such three aspects as information consumer, information provider and information communication etc. In a P2P network, rights and duties possessed by every node are all equal.

Figure 1:
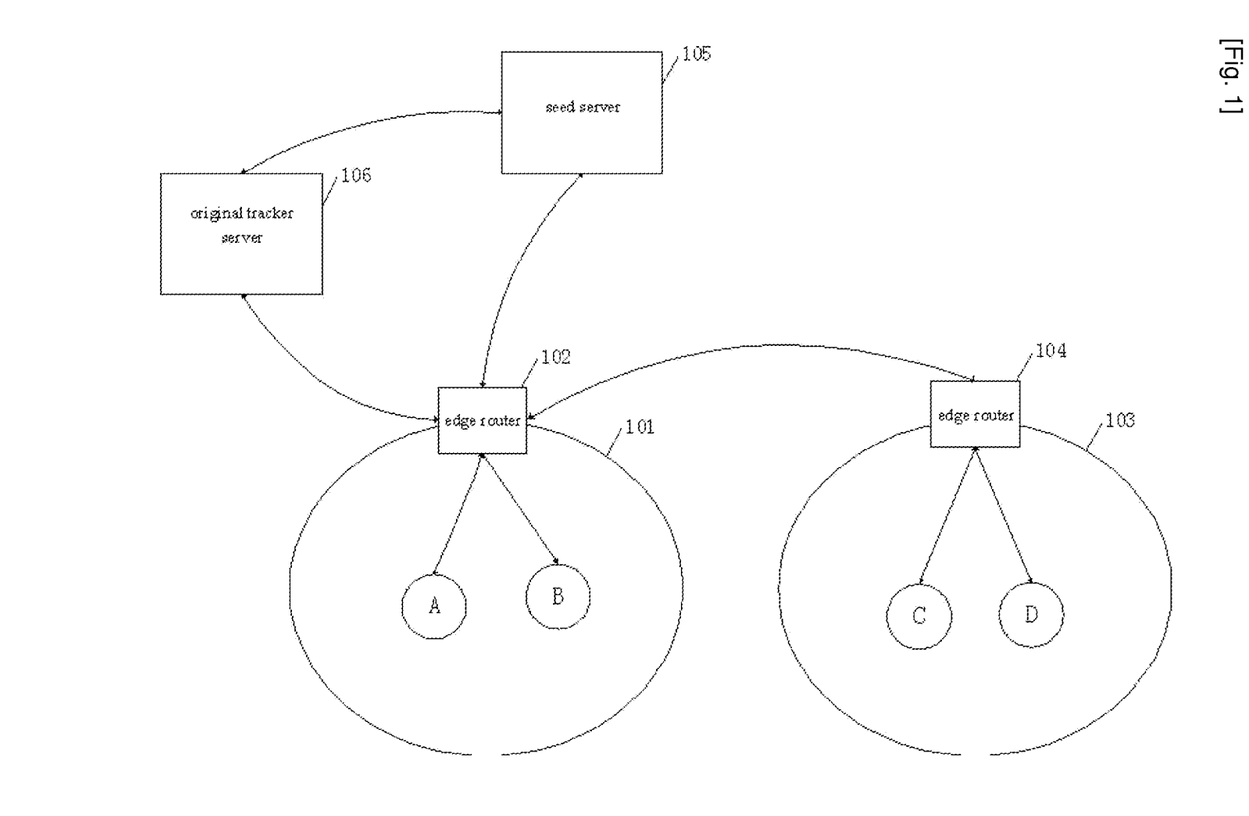
FIG. 1 is a schematic view of typical P2P file transmission.

FIG. 1 shows a schematic view of typical P2P file transmission. Regional network 101 contains node A and node B, and node A and node B are in contact with other nodes outside through edge router 102. Regional network 103 contains node C and node D. Node C and node D are in contact with other nodes outside through edge router 104. Assuming a user in node A wants to acquire a P2P file, node A first needs to acquire a seed file (a.torrent for example) corresponding to the P2P file from a seed server 105. According to BitTorrent protocol, a file issuer will generate and provide a .torrent file (i.e. seed file, also referred as "seed") according to the file to be issued. The .torrent file is substantially a text file, which contains two parts: tracker server information and file information. Tracker information is mainly address of the tracker server that needs to be used during BT downloading and settings for the tracker server, and file information is generated according to calculation on object file, the result of calculation is encoded according to B encoding rule (Bencode encoding) in BitTorrent protocol. Its main principal is to virtually divide the file provided for downloading into blocks with equal size, and write index information and Hash verification code of each block into .torrent file; thus .torrent file is an "index" of the downloaded file. If user node A wants to download file content, it first needs to acquire corresponding .torrent file, and then uses BT client software to perform download.

Figure 4A:
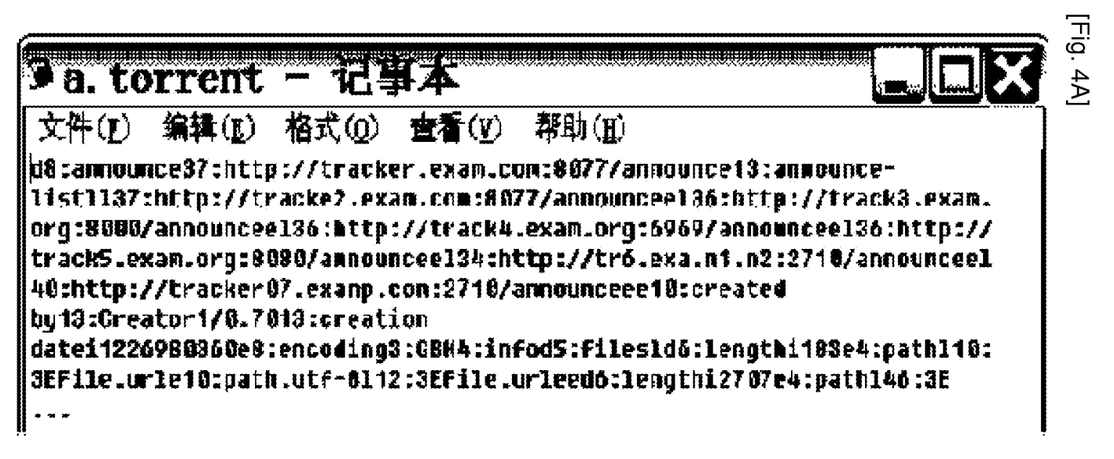
FIG. 4A is a schematic view of a typical P2P seed file.

FIG. 4A shows a schematic view of a.torrent. Table 1 gives a detailed explanation for content contained in a.torrent.

TABLE 1

| content in a.torrent file | meaning |
| --- | --- |
| D | Structure of seed file is "dictionary" type. |

TABLE 1-continued

| content in a.torrent file | meaning |
| --- | --- |
| 8:announce37:http://tracker.ex-am.com:8077/announce | Specifying information of corresponding original tracker server 106 |
| 13:announce-list | Start symbol of backup original tracker server information |
| 1137:http://tracke2.exam.com:8077/an-nouncee | First backup original tracker server |
| 136:http://track3.exam.org:8000/an-nouncee | Other backup tracker server |
| 136:http://track4.exam.org:6969/an-nouncee | |
| 136:http://track5.exam.org:8080/an-nouncee | |
| 134:http://tr6.exa.n1.n2:2710/an-nouncee | |
| 140:http://track07.examp.com:2710/an-nounceee | |
| 10:created by13:Creator1/0.70 | Creator software |
| 13:creation datei1226980360e | Creation date |
| 8:encoding3:GBK | Encoding format |
| 4:infod5:files1d6:lengthi183e4:path 110:3FFile.urle10:path.utf-8112:3EF ile.urleed6:lengthi2707e4:path146:3 E... | Start portion of file information |
| <Other content> | Content portion of file information |

Downloadable node list corresponding to the seed file is stored in the original tracker server 106, as shown in table 2 below. Actually, seed server 105 and original tracker server 106 may be hosted in a same physical server. In table 2, assuming that a P2P file is divided into 4 portions, nodes B, C, D possess several blocks of the P2P file respectively. By acquiring the node list, user node A knows it will connects to which nodes to acquire corresponding file blocks. Since node list may change continuously during operation, for example, new node will be added in continuously and original node will exit continuously, user node A may need to communicate with original tracker server 106 periodically during downloading to query the latest node list.

TABLE 2

| Node | IP address | File block identifier |
| --- | --- | --- |
| B | 10.1.1.1 | 1, 2, 3, 4 |
| C | 20.1.1.2 | 1, 2 |
| D | 20.1.1.3 | 3, 4 |

SUMMARY OF INVENTION

Technical Problem

Currently, P2P file transmission takes a significant portion in overall traffic of network transmission bandwidth. P2P communication can lead to abnormal traffic, cause accidental damage to network resource, and such problems as network jam, performance degradation and user dissatisfaction due to P2P communication may affect normal network application, such as WWW, E-mail etc, and normal user is further dissatisfied with slow speed of webpage browsing as well as receiving/sending email. For P2P communication, currently, there is no effective rate-limiting and directing scheme.

Solution to Problem

In order to solve the problems in the art, the present invention provides an efficient, flexible P2P file transmission management technology. The invention realizes rate-limiting and directing of P2P file transmission mainly by replacing an original tracker server with a setting controllable tracker server, and modifying node list based on predetermined rule in the controllable tracker server.

Advantageous Effects of Invention

With the present invention, a network operator can strengthen the controllable tracker server in P2P communication gradually by weakening the original tracker server in P2P communication gradually, and utilize various rules or policies established in advance to manage file transfer of P2P nodes.

Specifically, the invention provides a controllable tracker server for modifying node list of a peer-to-peer P2P file, including: an acquiring means for acquiring a node list in an original tracker server corresponding to a P2P file; a judging means for judging whether the node list needs to be modified according to a predetermined rule; a node list modifying means for modifying the node list in case that the node list needs to be modified; and a returning means for returning the modified node list to a user.

The invention also provides a system for managing transmission of peer-to-peer P2P file, the system including a server processing means, the server processing means further including: a receiving means for receiving P2P seed file requested by a user; a parsing means for parsing the P2P seed file to acquire original tracker server information therein; and a seed file modifying means for modifying the P2P seed file to replace the original tracker server therein with a controllable tracker server.

The invention also provides a method for modifying node list of a peer-to-peer P2P file, including: acquiring a node list in an original tracker server corresponding to a P2P file; judging whether the node list needs to be modified according to a predetermined rule; modifying the node list in case that the node list needs to be modified; and returning the modified node list to a user.

The invention also provides a method for managing transmission of peer-to-peer P2P file, including: acquiring a P2P seed file requested by a user; parsing the P2P seed file to acquire original tracker server information therein; and modifying the P2P seed file to replace the original tracker server therein with a controllable tracker server.

The above description illustrates some advantages of the invention on the whole, and these and other advantages will become more apparent by combining drawings and detailed description of the preferred embodiments of the invention. The drawings referred in the description are only used to illustrate typical embodiments of the invention, and should not be considered as a limitation to the scope of the invention.

DESCRIPTION OF EMBODIMENTS

In the following discussion, a large amount of specific details are provided to facilitate thoroughly understand the invention. However, for those skilled in the art, it is evident that it will not affect the understanding of the invention even without these specific details. It should be recognized that, the usage of any of following specific terms is merely for ease of description, thus the invention should not be limited to any specific application that is identified and/or implied by such terms.

Unless otherwise stated, the function described in the invention may be implemented by software or hardware or combination thereof. However, in an embodiment, unless otherwise stated, these functions are performed by processors (such as computers or electronic data processors) based on encoded integrated circuits (such as encoded by computer programs). Generally, the method performed for implementing embodiments of the invention may be a part of operation system or specific application programs, program, module, object or instruction sequence. The software of the invention generally includes various instructions that will be presented as machine readable format by local computers, thus are executable instructions. Further, program includes variables and data structures that are resident in local with respect to the program or that are found in memory. Moreover, various programs described below can be identified by application methods for implementing them in specific embodiment of the invention. Such signal bearing media, when carrying thereon computer readable instructions pointing to the function of the invention, represents embodiments of the invention.

Figure 2A:
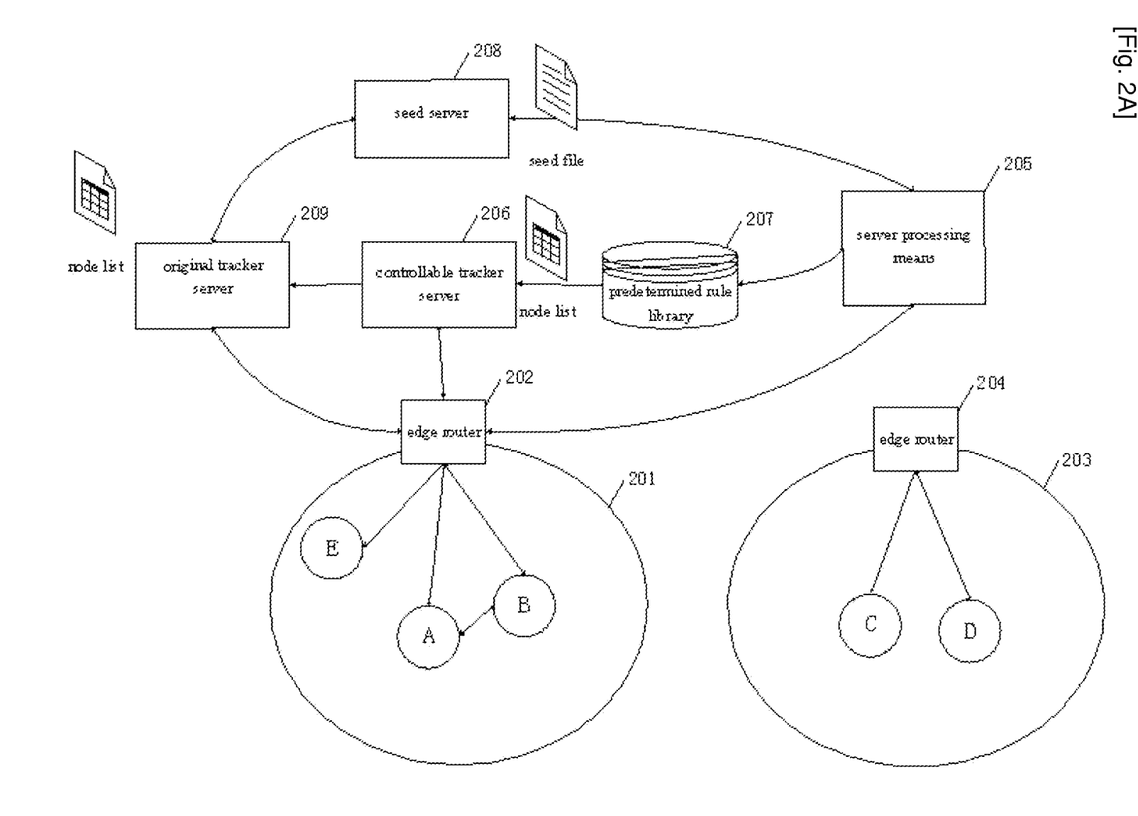
FIG. 2A is a schematic view of limiting P2P file transmission according to an embodiment of the invention.

FIG. 2A is a schematic view of limiting P2P file transmission according to an embodiment of the invention. Cell 201 includes nodes A, B, E, cell 203 includes C, D. Nodes A, B, E are in contact with outside through an edge router 202. Nodes C, D are in contact with outside through an edge router 204. If node A requests to acquire a seed file a.torrent on seed server 108, when the request passes through the edge router 202, the edge router 202 detects via a request sent by node A (such as HTTP request, FTP request and the like) that the request is a request to acquire P2P seed file, the edge router sends the request to a server processing means (tracker processor) 25. Server processing means 205 forwards the request to seed server 208, and acquires corresponding a.torrent file from seed server 208. FIG. 4A is a schematic view of typical P2P seed file.

Next, the server processing means 205 parses a.torrent file, detects tracker server information therein, and when it finds that tracker server in the seed file is a non-controllable tracker server, i.e., original tracker server 209, it modifies a.torrent file and replaces the original tracker server 209 therein with the controllable tracker server 206. The controllable tracker server 206 is used to remove dependence of node A on original tracker server 209, such that node A does not need to communicate with original tracker server 209 during subsequent downloading of P2P seed file, but only with the controllable tracker server 206.

The IP address of the controllable tracker server may be stored in the server processing means 205, or may be stored in a predetermined rule library 207. When IP address of the controllable tracker server is stored in the predetermined rule library 207, the server processing means 205 needs to communicate with the predetermined rule library 207 to acquire the IP address of the controllable tracker server.

Figure 4B:
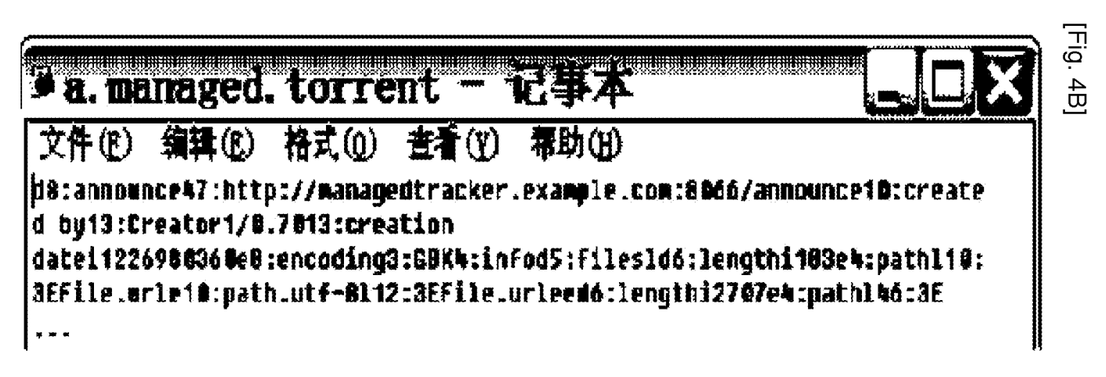
FIG. 4B is a schematic view of a P2P seed file modified according to an embodiment of the invention.

FIG. 4B is a schematic view of a P2P seed file modified according to an embodiment of the invention. Table 3 below lists detailed explanation of modified a.torrent file item by item.

TABLE 3

| content in modified a.torrent file | meaning |
| --- | --- |
| D | Structure of seed file is "dictionary" type. |
| 8:announce47:http://managedtracker.example.com:8066/announce | Tracker server has been replaced from original tracker server to controllable tracker server. Backup original tracker server information is deleted. Server processing means 205 may also set backup controllable tracker server (not shown in figure). |
| 10:created by13:Creator1/0.70 | Creator software. Although in an embodiment of the invention, creator software is not modified, server processing means 205 may modify original creator software. |
| 13:creation datei1226980360e | Creation date. Although in an embodiment of the invention, creation date is not modified, server processing means 205 may modify original creation date information. |
| 8:encoding3:GBK | Encoding format of file information. Although in an embodiment of the invention, encoding format of file information is not modified, server processing means 205 may modify original encoding format, and needs to re-encode subsequent file information after the encoding format is modified. |
| 4:infod5:files1d6:lengthi183e4:path110:3FFile.urle10:path.utf-8112:3EFile.urleed6:lengthi2707e4:path146:3E... | Start portion of file information |
| <Other content> | Content portion of file information |

It should be particularly noted that, although the invention is described with one controllable tracker server 206, it can use a plurality of controllable tracker servers in practice. When a plurality of controllable tracker servers is used, one main controllable tracker server and several backup controllable tracker servers may be set in a.torrent file.

The modified seed file will be returned to node A, and node A will further communicate with controllable tracker server 206 according to index of the seed file to acquire node list.

The controllable tracker server 206 will acquire node list corresponding to the seed file from the original tracker server 209, and judge whether the node list needs to be modified according to predetermined rule acquired from the predetermined rule library 207.

The predetermined rule may be that a node that is not in a same region as the user is filtered out from the node list. According to an embodiment of the invention, node A is not in a same cell as nodes C, D, thus the controllable tracker server 206 will delete nodes C, D from node list. The deleted node list is shown as table 4 below.

TABLE 4

| Node | IP address | File block identifier |
| --- | --- | --- |
| B | 10.1.1.1 | 1, 2, 3, 4 |

A method for judging whether node A is in a same region as other node via subnet mask is described in detail below.

Assuming that subnet mask is 24 bits, i.e., subnet mask is 255.255.255.0, there are 255 IP addresses available for such subnet mask, thus it can be easily judged whether two IP addresses are in a same region by AND operation between subnet mask and IP address. For example, IP address 10.1.1.1 and IP address 10.1.1.2 are nodes in a same region. For subnet mask having 16 bits, i.e., subnet mask is 255.255.0.0, IP address 10.1.1.1 and IP address 10.1.2.13 belong to a same region. As can be appreciated by those skilled in the art, although the invention makes description by taking subnet mask having 16 bits and 24 bits as examples, subnet mask having other number of bits may also be used, such as 22 bits, 25 bits and the like, to judge whether two IP addresses are in a same region.

Figure 5:
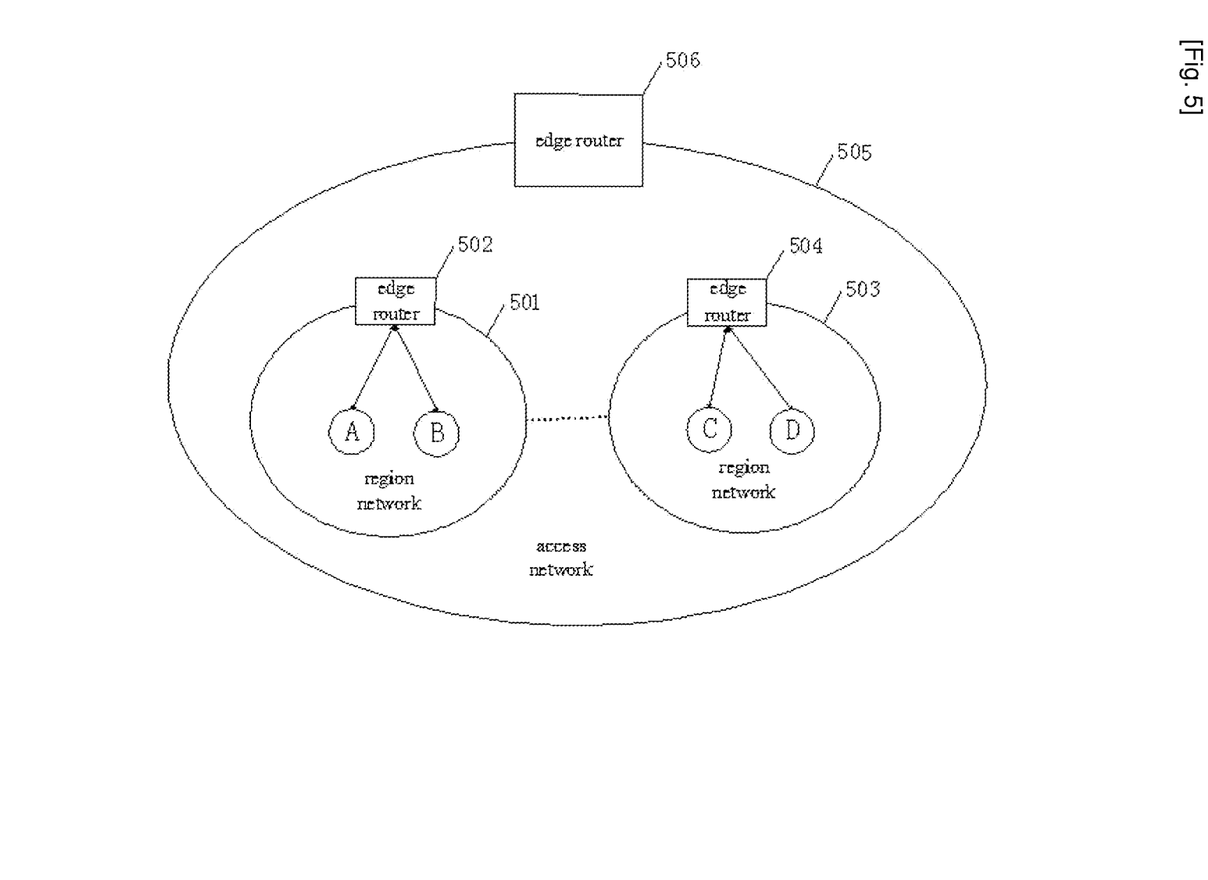
FIG. 5 is a schematic view of dividing regions according an embodiment of the invention.

According to an embodiment of the invention, only node within a regional network is allowed to transmit P2P file, as can be appreciated by those skilled in the art, the range of regional network can be expanded to multi-level access network, i.e., all nodes within an access network with same level are allowed to transmit P2P file. FIG. 5 is a schematic view of dividing regions according an embodiment of the invention. In the embodiment of FIG. 5, node A may communicate with nodes C and D, because nodes C and D belong to a same access network 505 as node A.

According to another embodiment of the invention, in case that current network transmission load exceeds a predetermined threshold, for example, it is above a percent value, node that is not in a same region as the user is filtered out from the node list.

According to still another embodiment of the invention, during network transmission peak time, for example, from 9 a.m. to 5 p.m., node that is not in a same region as the user is filtered out from the node list.

According to still another embodiment of the invention, if user's subscription state meets a predetermined condition, for example, for users who pay monthly, node that is not in a same region as the user is filtered out from the node list, or for non-VIP users, node that is not in a same region as the user is filtered out from the node list.

According to still another embodiment of the invention, at least one specific node is filtered out from the node list, for example, a node that is known to specially propagate illegal works is filtered out.

As can be appreciated by those skilled in the art, other predetermined rule can be established according to the demand of network operator to achieve limitation on P2P communication node.

The controllable tracker server 206 can further determine whether the deleted node contains file block of the P2P file that is not contained in un-deleted node. For example, assuming node B does not store all of the file blocks of the P2P file, and node B only stores file blocks 1, 2, 3 but not file block 4, then node A can not acquire file block 4 from node B according to the above modified node list (table 4), and then the controllable tracker server 206 may cancel the modification to the node list. The un-modified node list can still be returned to user.

Figure 3:
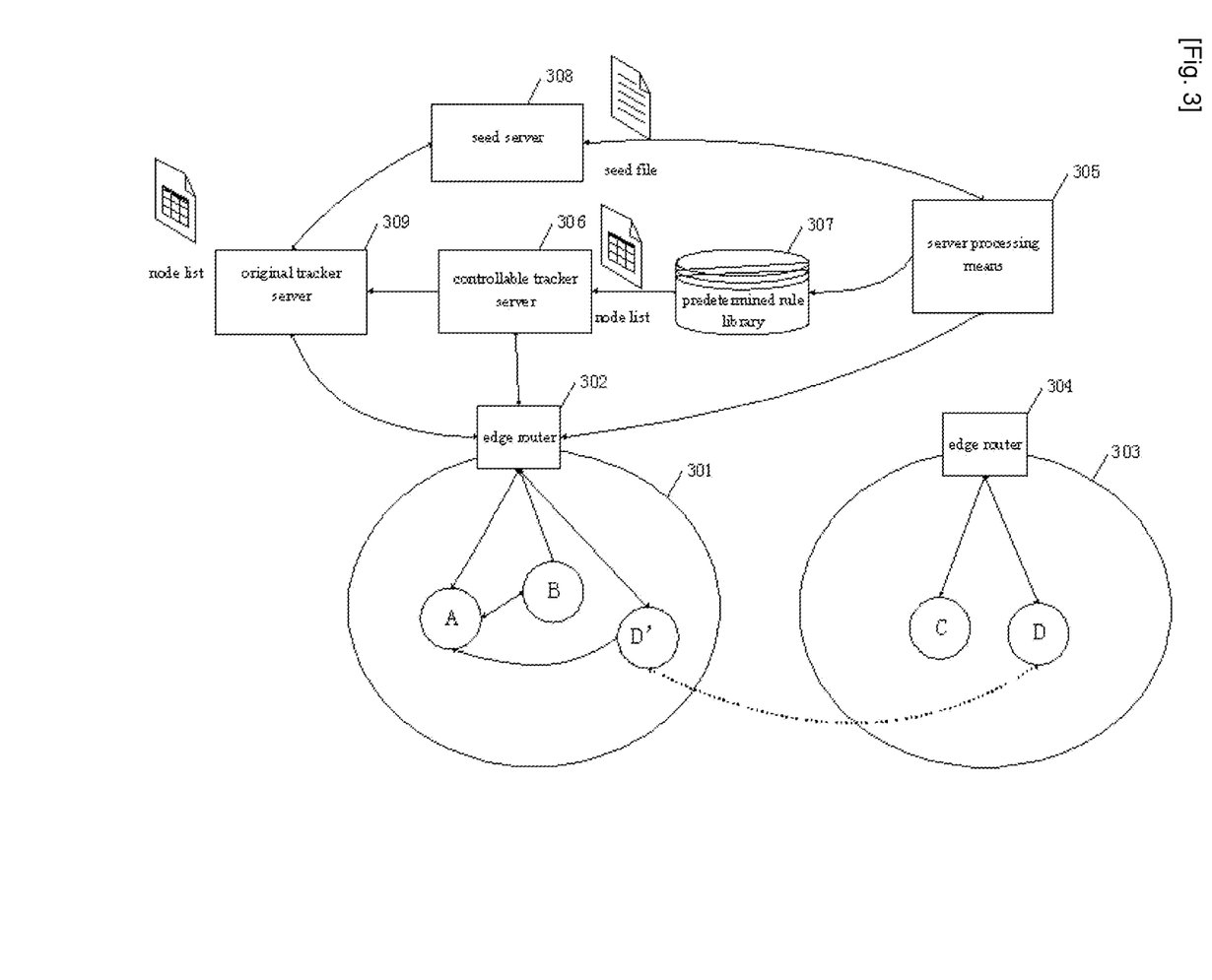
FIG. 3 is a schematic view of directing P2P file transmission according to an embodiment of the invention.

In case that node list may be modified, the modified node list is sent to an edge router 302, and in turn is returned to node A. After node A acquires the modified node list, it communicates with node in node list, e.g. node B, to acquire the desired P2P file block. This not only can increase downloading efficiency of node A, but also can reduce communication load of the entire network.

Since the modified seed file can be cached at the predetermined rule library 207 or server processing means 205, what needs to be cached are modified seed file and seed file before modification. Caching of seed file before modification can facilitate to judge whether subsequent user requests the same seed file. The seed file before modification can be stored in form of seed file, or the verification code thereof can be stored. Caching of the verification code of seed file can further save storage space, but it needs to consume more computation resource to calculate the verification code of requested seed file. When node E also issues a request for the same seed file a.torrent through edge router 202, the server processing means 205 may send the modified seed file to node E, such that node E communicates with the controllable tracker server 206. The controllable tracker server 206 modifies node list according to predetermined rule, and returns it to node E.

Figure 2B:
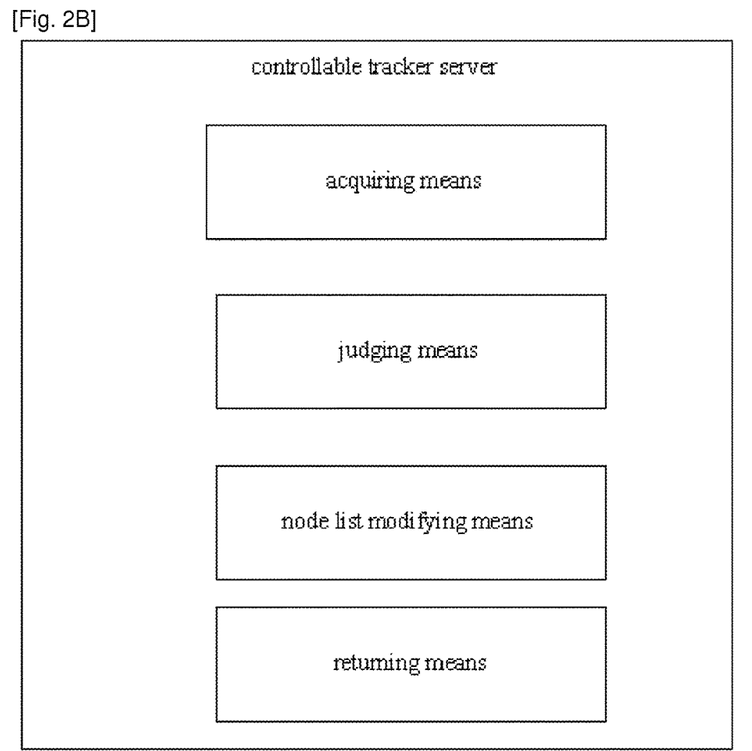
FIG. 2B is a structural block diagram of the controllable tracker server according to an embodiment of the invention.

FIG. 2B is a structural block diagram of the controllable tracker server according to an embodiment of the invention. The controllable tracker server includes: an acquiring means for acquiring a node list in an original tracker server corresponding to a P2P file; a judging means for judging whether the node list needs to be modified according to a predetermined rule; a node list modifying means for modifying the node list in case that the node list needs to be modified; and a returning means for returning the modified node list to a user.

Figure 2C:
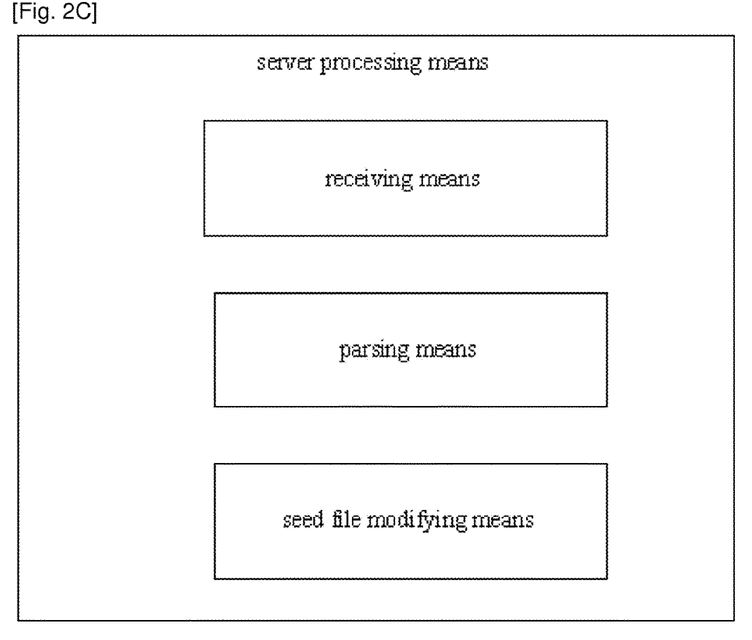
FIG. 2C is a structural block diagram of the server processing means according to an embodiment of the invention.

FIG. 2C is a structural block diagram of the server processing means according to an embodiment of the invention. The server processing means includes: a receiving means for receiving a P2P seed file requested by a user; a parsing means for parsing the P2P seed file to acquire tracker server information therein; and a seed file modifying means for modifying the P2P seed file to replace an original tracker server therein with the controllable tracker server.

FIG. 3 is a schematic view of directing P2P file transmission according to an embodiment of the invention. The functions of elements in FIG. 3 are substantially the same as that of the elements that have same names in FIG. 2A. Server processing means 305 is used to modify P2P seed file, such that node A can communicate with the controllable tracker server 306, and the controllable tracker server 306 modifies the node list according to the rule in a predetermined rule library. According to the embodiment in FIG. 3, when the controllable tracker server 306 determines that the modified node list does not have sufficient nodes for node A to acquire the P2P file, for example, only file blocks 1, 2, 3 are stored in node B, the controllable tracker server 306 initiates node D' in region 301 as a mapping node of node D in region 303. P2P file blocks, i.e., blocks 3 and 4, that are the same as node D are stored in node D'. The controllable tracker server 306 further adds node D' into the node list to form a node list as shown in the following table 5, and the node list is returned to user.

TABLE 5

| Node | IP address | File block identifier |
| --- | --- | --- |
| B | 10.1.1.1 | 1, 2, 3 |
| D' | 20.1.1.3 | 3, 4 |

Node A may communicate with node B and node D' in its own region according to the information in table 5.

As can be appreciated by those skilled in the art, the node D' may also optionally store a portion of file blocks in node D, for example, it only stores file block 4 but not file block 3. This can further save storage space in mapping node, and will not prevent node A from acquiring the P2P file.

In the above embodiment, node D' is initiated and P2P file segments in node D are copied to node D', this may consume some network resource, however, once node D' is initiated in region 301, when other node in region 301 hereafter requests the same P2P file, corresponding resource can be quickly acquired from local node. In order to enhance storage efficiency, the P2P file can be stored in node D' for a predetermined period of time, for example, one week, or one month etc.

As can be appreciated by those skilled in the art, node D' can further meet additional rules besides the predetermined rules. For example, not only node D' is in the same region network as node A, but also node D' is only initiated during a period that is not network transmission peak time.

According to an embodiment of the invention, although the controllable tracker server modifies node list, the controllable tracker server may still communicate with the original tracker server periodically to acquire updated node list corresponding to the P2P seed file, and modify the updated node list again according predetermined rule. This is because, if the controllable tracker server is notified of addition and deletion of a node that communicates with original tracker server, an updated node list can be maintained in the controllable tracker server, the controllable tracker server may modify the updated node list, and send the modified updated node list to user node A.

Figure 6A:
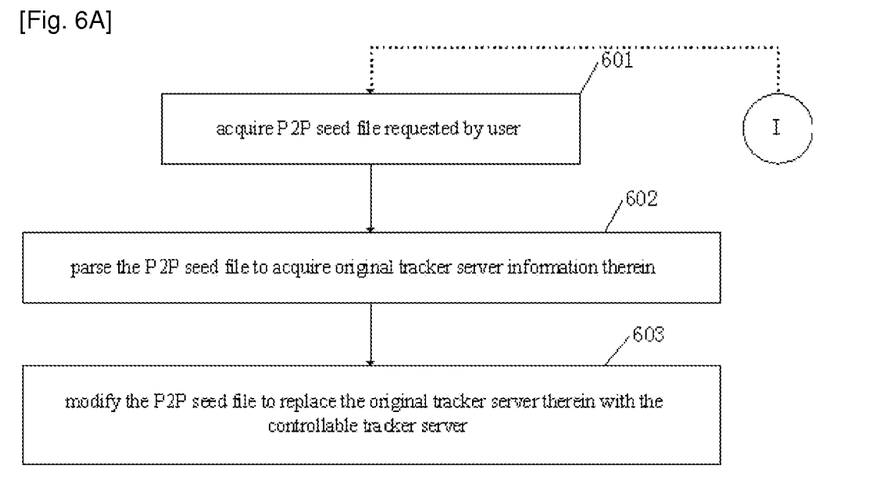
FIG. 6A is a flow diagram of managing P2P file transmission according to an embodiment of the invention.

FIG. 6A is a flow diagram of managing P2P file transmission according to an embodiment of the invention. P2P seed file requested by a user is acquired in step 601. The P2P seed file is parsed to acquire original tracker server information therein in step 602, and the parsed P2P seed file is shown in above table 1. The P2P seed file is modified to replace the original tracker server therein with the controllable tracker server in step 603, and the modified P2P seed file is shown in FIG. 4B. The P2P seed file is modified to replace the original tracker server therein with the controllable tracker server in step 603.

Figure 6B:
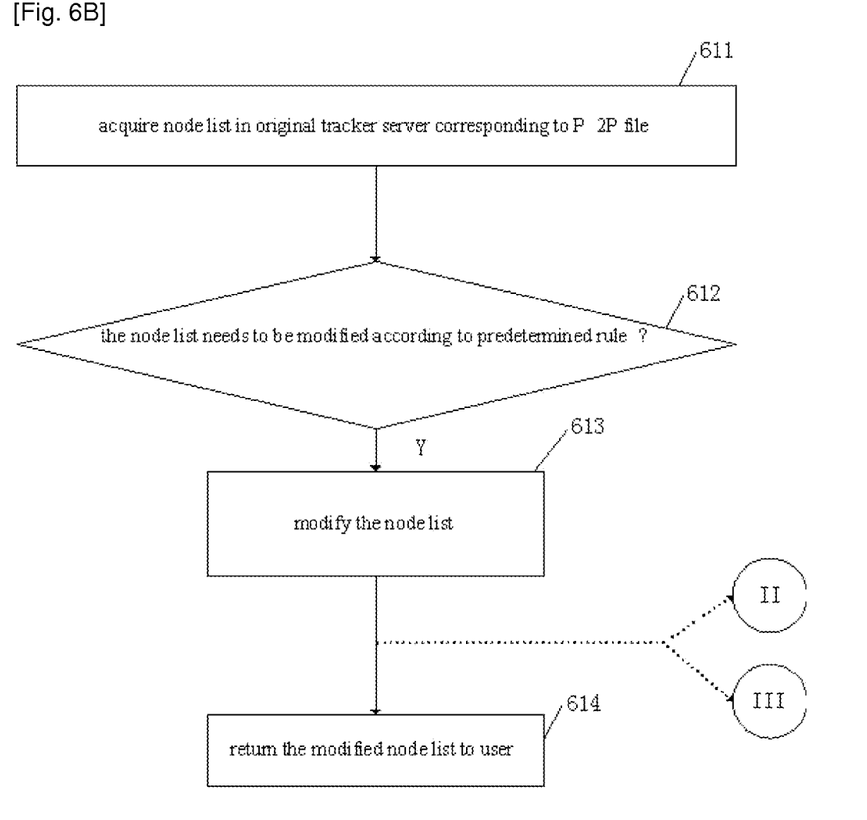
FIG. 6B is a flow diagram of modifying node list of a P2P file according to an embodiment of the invention.

FIG. 6B is a flow diagram of modifying node list of a P2P file according to an embodiment of the invention. Node list in original tracker server corresponding to a P2P file is acquired in step 611. It is judged whether the node list needs to be modified according to a predetermined rule in step 612. According to an embodiment of the invention, the predetermined rule may be that node that is not in a same region as the user is filtered out from the node list. Thus, if all of the nodes in the node list are in a same region as the user, the node list needs not to be modified (not shown in figure). If there is node in the node list that is not in a same region as the user, then the node list is modified in step 613.

The modified node list is shown in above table 4. The modified node list is returned to user in step 614.

As can be appreciated by those skilled in the art, the predetermined rule is not limit to the above mentioned embodiments, instead, it can have various variations, including: node that is not in a same region as the user is filtered out from the node list in case that current network transmission load exceeds a predetermined threshold, node that is not in a same region as the user is filtered out from the node list during network transmission peak time, node that is not in a same region as the user is filtered out from the node list if user's subscription state meets a predetermined condition, or at least one specific node is filtered out from the node list.

FIG. 6A and FIG. 6B specify some additional steps in the invention through nodes I, II, III that are connected by dashed lines. They will be explained below.

Figure 7:
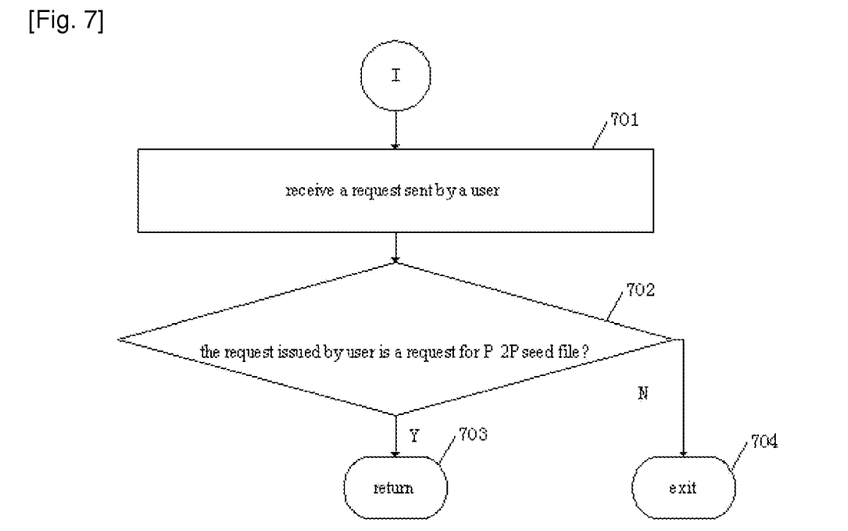
FIG. 7 is a flow diagram of monitoring P2P seed file according to an embodiment of the invention.

FIG. 7 is a flow diagram of monitoring P2P seed file according to an embodiment of the invention. A request, e.g. a HTTP request, sent by user is received in step 701. The characteristic values of seed file are carried in HTTP request message. By monitoring these characteristic values, it is judged whether the request issued by user is a request for P2P seed file in step 702. If the request is a request for P2P seed file, the process returns to node I and proceeds to steps in FIG. 6A in step 703. If the request is not a request for P2P seed file, then process exits in step 704 and does not return to node I.

Figure 8:
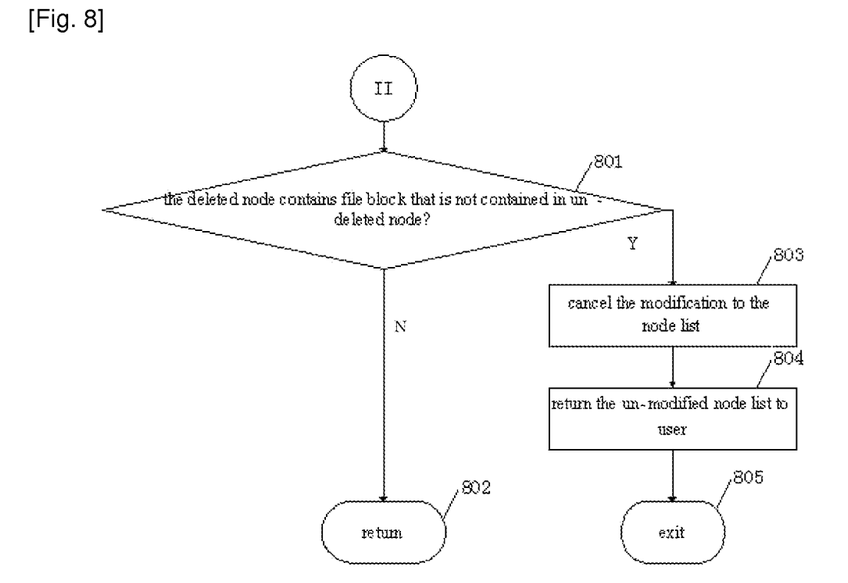
FIG. 8 is a flow diagram of canceling modification to the node list according to an embodiment of the invention.
Figure 9:
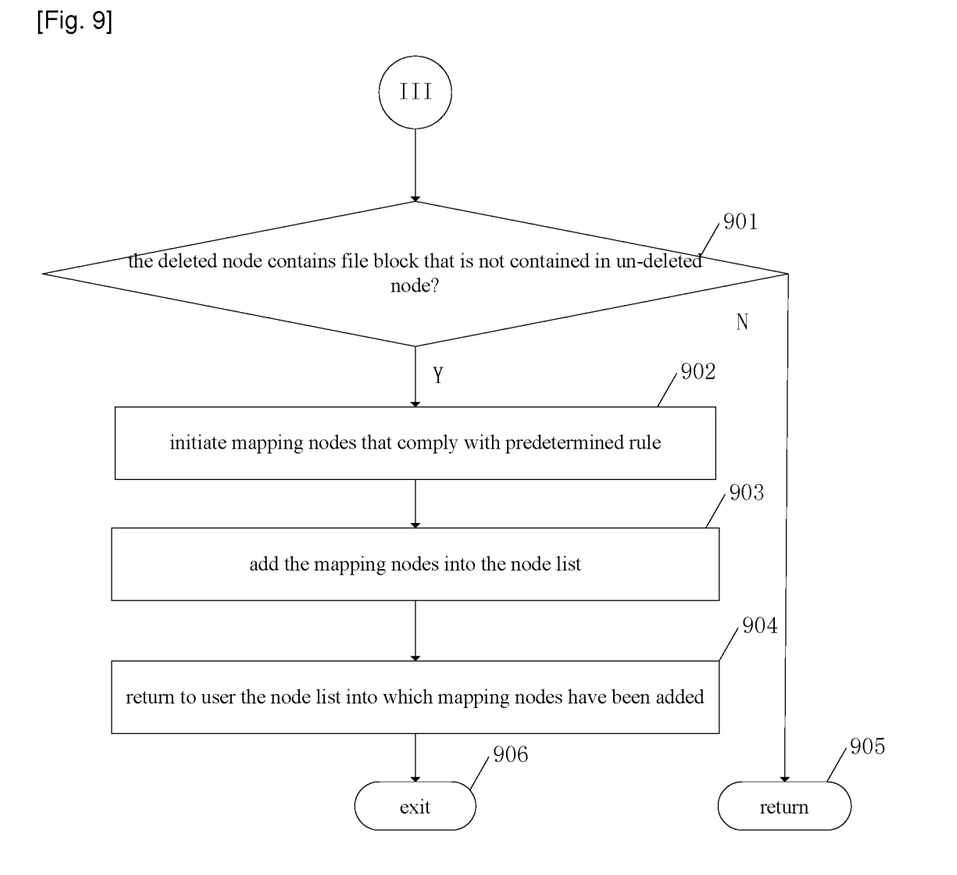
FIG. 9 is a flow diagram of directing P2P file transmission according to an embodiment of the invention.

FIG. 8 and FIG. 9 describe two embodiments of further processing the modified node list. FIG. 8 is a flow diagram of canceling the modification to the node list according to an embodiment of the invention. In FIG. 8, it is first determined whether the node deleted from the node list contains file block of the P2P file that is not contained in un-deleted node in step 801. If the determination result is no, i.e., all the file blocks contained in the deleted node can be found in un-deleted node, then process returns to node II and proceeds to corresponding steps in FIG. 6B in step 802. If the determination result is yes, i.e., at least one file block contained in the deleted node can not be found in un-deleted node, then modification to the node list is canceled in step 803, and the un-modified node list is returned to user in step 804, and the process exits in step 805 and does not return to node II.

FIG. 9 is a flow diagram of directing P2P file transmission according to an embodiment of the invention. It is determined whether the node deleted from the node list contains P2P file block that is not contained in un-deleted node in step 901. If the determination result is yes, i.e., at least one file block contained in the deleted node can not be found in the un-deleted node, then sufficient mapping nodes that comply with predetermined rule are initiated in step 902, the mapping nodes store therein P2P file blocks that are the same as that of nodes deleted from the node list. The mapping nodes are added into the node list in step 903, and the node list into which the mapping nodes are added is returned to user in step 904. Then, the process exits node III in step 906 and does not proceed to corresponding steps in FIG. 6B.

If the determination result is no, i.e., all the file blocks contained in the deleted node can be found in the un-deleted node, then process returns to node III and proceeds to corresponding steps in FIG. 6B in step 905.

As can be appreciated by those skilled in the art, each of the above operation process can be implemented by executable program that is stored in a computer program product. The program product defines functions of various embodiments, and carries various signals including (but not limit to): 1) information permanently stored on non-erasable storage media; 2) information stored on erasable storage media; or 3) information transferred to a computer via communication media including wireless communication (such as via computer network or telephone network), specifically, including information downloaded from Internet and other network.

Various embodiments of the invention can provide many advantages, including those that are illustrated in summary of the invention and that can be derived from technical solution itself. However, whether one embodiment can gain all advantages, and whether such advantages are considered as substantial improvement, they are not limitation to the invention. Meanwhile, various implementations mentioned above are merely for illustration purpose, those skilled in the art can make various modifications and alternations to the above implementations without departing from the substance of the invention. The scope of the invention is entirely defined by the appended claims.

REFERENCE SIGNS LIST

102 edge router
104 edge router
105 seed router
106 original tracker server
208 seed server
209 original tracker server
206 controllable tracker server
207 predetermined rule library
205 server processing means
202 edge router
204 edge router
502 edge router
504 edge router
506 edge router

The invention claimed is:

1. A method for modifying a node list of a peer-to-peer (P2P) file in a system including a controllable tracker server, a server processor device, and an original tracker server,
wherein the server processor device receives a P2P seed file requested by a user computing node, acquires tracker server information based on the P2P seed file, the tracker server information including an address of the original tracker server corresponding to the P2P seed file, and modifies the tracker server information of the P2P seed file to change the address of the original tracker server corresponding to the P2P seed file to an address of the controllable tracker server,
wherein the method includes:
acquiring, using a processor device of the controllable tracker server, a node list corresponding to the P2P file in the original tracker server, wherein the P2P file corresponds to the P2P seed file and includes a plurality of P2P file blocks;
judging, by the processor device, whether the node list needs to be modified according to a predetermined rule;
modifying the node list, by the processor device, when the node list needs to be modified; and
returning, by the processor device, the modified node list to the requesting user computing node over a communications network,
wherein the user computing node is configured to communicate with another computing node in said modified node list to obtain at least one of the P2P file blocks, wherein the modifying of the node list includes deleting at least one computing node in the node list according to the predetermined rule, said predetermined rule comprising deleting the at least one computing node that is not within a same region as the user computing node from the node list when the current network transmission load exceeds a predetermined threshold; and wherein the method further comprises:

determining, by the processor device, whether the deleted at least one computing node contains a first P2P file block of the P2P file that is not contained in an undeleted computing node of the modified node list;

initiating, by the processor device, a mapping node corresponding to the deleted at least one computing node not within a same region in response to determining that the deleted at least one computing node contains the first P2P file block of the P2P file that is not contained in the undeleted computing node;

transferring, by the processor device, a copy of the first P2P file block from the deleted at least one computing node not within a same region to the mapping node, the mapping node being a peer computing node within a same network region as the user computing node, the mapping node having at least the first P2P file block copied from the deleted at least one computing node not within a same region; and adding, by the processor device, the mapping node into the node list.

2. The method according to claim 1, wherein the first P2P file block copied stored in the mapping node is stored for a predetermined period of time.

3. The method according to claim 1, wherein the predetermined rule includes at least one of the following rules:

deleting a node that is not within a same region as the user computing node from the node list;

deleting a node that is not within a same region as the user computing node from the node list during network transmission peak time; or deleting at least one specific node from the node list.

4. The method according to claim 1, further including:

communicating with the original tracker server periodically to acquire an updated node list corresponding to the P2P file.

5. A system including a server processor device, a controllable tracker server, and an original tracker server, wherein the server processor device receives a peer-to-peer (P2P) seed file requested by a user computing node, acquires tracker server information based on the P2P seed file, the tracker server information including an address of the original tracker server corresponding to the P2P seed file, and modifies the tracker server information of the P2P seed file to change the address of the original tracker server corresponding to the P2P seed file to an address of the controllable tracker server, wherein the controllable tracker server includes:

a memory storage device;

a hardware processor device in communication with said memory storage device and configured to:

acquire a node list stored in the original tracker server corresponding to a P2P file, wherein the P2P file corresponds to the P2P seed file and includes a plurality of P2P file blocks;

judge whether the node list corresponding to the P2P file needs to be modified according to a predetermined rule;

modify the node list when the node list needs to be modified; and return the modified node list to the requesting user computing node over a communications network, wherein the user computing node is configured to communicate with another computing node in said modified node list to obtain at least one of the P2P file blocks, wherein the modifying of the node list includes deleting at least one computing node in the node list according to the predetermined rule, said predetermined rule comprising deleting the at least one computing node that is not within a same region as the user computing node from the node list when the current network transmission load exceeds a predetermined threshold; and wherein the hardware processor device is further configured to:

determine whether the deleted at least one computing node contains a first P2P file block of the P2P file that is not contained in an undeleted computing node of the modified node list;

initiate a mapping node corresponding to the deleted at least one computing node not within the same region in response to determining that the deleted at least one computing node contains the first P2P file block of the P2P file that is not contained in the undeleted computing node;

transfer a copy of the first P2P file block from the deleted at least one computing node not within the same region to the mapping node, the mapping node being a peer computing node within a same network region as the user computing node, the mapping node having at least the first P2P file block copied from the deleted at least one computing node not within the same region; and add the mapping node into the node list.

6. The system according to claim 5, wherein the first P2P file block copied stored in the mapping node is stored for a predetermined period of time.

7. The system according to claim 5, wherein the predetermined rule includes at least one of the following rules:

deleting a node that is not within a same region as the user computing node from the node list;

deleting a node that is not within a same region as the user computing node from the node list during network transmission peak time; or deleting at least one specific node from the node list.

8. The system according to claim 5, wherein the processor device is further configured to:

communicate with the original tracker server periodically to acquire an updated node list corresponding to the P2P file.

9. A method for managing transmission of a peer-to-peer (P2P) file over a communications network including a controllable tracker server, a server processor device, and an original tracker server, wherein said method includes:

acquiring a P2P seed file requested by a user computing node by the server processor device, wherein the user computing node requests the P2P seed file to the server processor device, the server processor device forwards the request of the P2P seed file to a seed server, and the server processor device receives the P2P seed file from the seed server;

parsing the P2P seed file acquired from the seed server, by the server processor device, to acquire tracker server information including an address of the original tracker server corresponding to the P2P seed file; and modifying the tracker server information of the P2P seed file to change the address of the original tracker server corresponding to the P2P seed file to an address of the controllable tracker server, wherein the controllable tracker server modifies node list of the P2P file by acquiring, using a processor device, a node list corresponding to the P2P file from the original tracker server and modifying said node list when needed according to a predetermined rule, wherein the modified node list is returned to the requesting user computing node over the communications network, wherein the user computing node is configured to communicate with another computing node in said modified node list to obtain at least one of a plurality of P2P file blocks of the P2P file, wherein to modify the node list includes deleting at least one computing node in the node list according to the predetermined rule, said predetermined rule comprising deleting the at least one computing node that is not within a same region as the user computing node from the node list when the current network transmission load exceeds a predetermined threshold; and wherein the processor device at the controllable tracker server is further configured to:

determine whether the deleted at least one computing node contains a first P2P file block of the P2P file that is not contained in an undeleted computing node of the modified node list;

initiate a mapping node corresponding to the deleted at least one computing node not within a same region in response to determining that the deleted at least one computing node contains the first P2P file block of the P2P file that is not contained in the undeleted computing node;

transfer a copy of the first P2P file block from the deleted at least one computing node not within a same region to the mapping node, the mapping node being a peer computing node within a same network region as the user computing node, the mapping node having at least the first P2P file block copied from the deleted at least one computing node not within a same region; and add the mapping node into the node list.

10. The method according to claim 9, further including: caching the modified P2P seed file.

11. The method according to claim 10, further including: returning the modified P2P seed file to another computing node when a request from the another computing node for the same P2P seed file is received.

12. A system for managing transmission of a peer-to-peer (P2P) file over a communications network, the system comprising:

one or more memory storage devices;

an original tracker server comprising a first processor device;

a controllable tracker server comprising a second processor device; and a server processor device in communication with the original tracker server, the controllable tracker server, and the one or more memory storage devices, and the server processor device configured to:

receive a P2P seed file requested by a user computing node, wherein the user computing node requests the P2P seed file to the server processor device, the server processor device forwards the request of the P2P seed file to a seed server, and the server processor device receives the P2P seed file from the seed server;

parse the P2P seed file received from the seed server to acquire tracker server information including an address of the original tracker server corresponding to the P2P seed file; and modify the tracker server information of the P2P seed file to change the address of the original tracker server corresponding to the P2P seed file to an address of the controllable tracker server, wherein the controllable tracker server has acquired a node list corresponding to the P2P file that is stored in the original tracker server, and has modified the acquired node list according to a predetermined rule, wherein the modified node list is returned to the requesting user computing node over the communications network, wherein the user computing node is configured to communicate with another computing node in said modified node list to obtain at least one of a plurality of P2P file blocks of the P2P file, wherein to modify the node list includes deleting at least one computing node in the node list according to the predetermined rule, said predetermined rule comprising deleting the at least one computing node that is not within a same region as the user computing node from the node list when the current network transmission load exceeds a predetermined threshold; and wherein the second processor device of the controllable tracker server is further configured to:

determine whether the deleted at least one computing node contains a first P2P file block of the P2P file that is not contained in an undeleted computing node of the modified node list;

initiate a mapping node corresponding to the deleted at least one computing node not within the same region in response to determined that the deleted at least one computing node contains the first P2P file block of the P2P file that is not contained in the undeleted computing node;

transfer a copy of the first P2P file block from the deleted at least one computing node not within the same region to the mapping node, the mapping node being a peer computing node within a same network region as the user computing node, the mapping node having at least the first P2P file block copied from the deleted at least one computing node not within the same region; and add the mapping node into the node list.

13. The system according to claim 12, wherein the memory storage device caches the modified P2P seed file.

14. The system according to claim 13, wherein the server processor device is further configured to:

receive a request from another user computing node for the same P2P seed file;

send the modified P2P seed file to the another user computing node in response to receiving the request from the another user computing node for the same P2P seed file.

* * * * *